United States Patent

Kaminaka et al.

[15] 3,691,278
[45] Sept. 12, 1972

[54] AROMATIC POLYCARBOXYLIC ACID HALIDES CONTAINING PHOSPHORUS

[72] Inventors: Hiroshi Kaminaka, Toyonaka; Norio Kotera, Amagasaki; Tatsuo Kanda; Hiroshi Kuruma, both of Toyonaka; Hideki Yanagihara, Takatsuki; Yoshiro Murata, Minoo, all of Japan

[73] Assignee: Sumitomo Chemical Company, Ltd., Osaka, Japan

[22] Filed: June 3, 1970

[21] Appl. No.: 43,205

[30] Foreign Application Priority Data

June 3, 1969 Japan..................44/43899

[52] U.S. Cl............260/942, 260/45.7 P, 260/45.95, 260/986
[51] Int. Cl.........................C07f 9/12, C08f 45/58
[58] Field of Search..............................260/942, 986

[56] References Cited

OTHER PUBLICATIONS

Wagner et al., " Synthetic Organic Chemistry," J. Wiley & Sons, Inc. New York, ( 1953), pp. 546– 547.

Primary Examiner—Joseph Rebold
Assistant Examiner—Anton H. Sutto
Attorney—Stevens, Davis, Miller & Mosher

[57] ABSTRACT

A polyhaloformyltriphenyl phosphate represented by the formula,

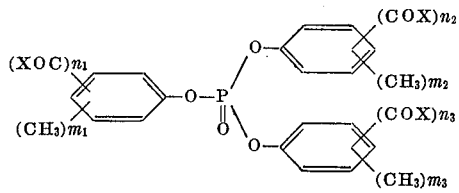

wherein X is a halogen atom, and each of $n$'s and of $m$'s is an integer of 0 to 2, is produced by reacting a corresponding polycarboxytriphenyl phosphate with a halogenating agent. The novel phosphates are useful as an acylating agent in organic syntheses and as an intermediate in the synthesis of fire-retarding and antiflaming products such as polymers and industrial chemicals.

5 Claims, No Drawings

AROMATIC POLYCARBOXYLIC ACID HALIDES CONTAINING PHOSPHORUS

This invention relates to a process for producing a novel aromatic carboxylic acid halide containing a phosphate linkage. More particularly, this invention relates to a process for producing a novel polyhaloformyltriphenyl phosphate and a methyl derivative thereof represented by the formula,

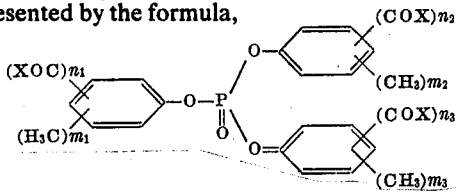

wherein X is a halogen atom; $n_1$, $n_2$ and $n_3$ each are integers of 0 to 2, provided the sum, $(n_1 + n_2 + n_3)$, is 2 or more; $m_1$, $m_2$ and $m_3$ each are integers of 0 to 2, provided each sum of $(n_1 + m_1)$, $(n_2 + m_2)$ and $(n_3 + m_3)$ is 3 or less; and the substitution site of a haloformyl group is selected from positions 3, 4 and 5 of each phenyl group. A group of compounds having said formula is hereinafter referred to as "TPP polycarboxylic acid halides."

Said TPP polycarboxylic acid halides, which are the subject of the present invention, are halogen derivatives of the aromatic carboxylic acid containing a phosphate linkage in their molecular structure, and are a group of new compounds which have never been described in the literature. These TPP polycarboxylic acid halides are acid halides derived from the corresponding carboxylic acids (hereinafter referred to as "TPP polycarboxylic acids") that had been successfully synthesized by some of the present inventors; said halides are more reactive than said acids, and consequently are more powerful acylating agents. Also, compared with corresponding TPP polycarboxylic acids the TPP polycarboxylic acid halides have lower melting points and higher solubilities in various solvents so that they may be used advantageously in producing various derivatives of TPP polycarboxylic acids.

The TPP polycarboxylic acid halides are solids or viscous liquids at room temperature, stable to heat, combustible with difficulty, and self-extinguishing. The phosphate linkage in the molecule is also stable to heat and is not easily decomposed. Thus, the TPP polycarboxylic acid halides have valuable properties particularly as the starting materials for producing synthetic resins, fibers and resistant, polymers that are required to be heat and flame resistant, and for producing fire retardants, antiflaming agents and fire-retarding plasticizers for general synthetic resins and for natural or synthetic fibers.

The TPP of polycarboxylic acid halides of the present invention have the general formula shown above, and examples thereof are as follows: various isomeric forms of dichloroformyltriphenyl, dibromoformyltriphenyl, or diiodoformyltriphenyl phosphates (halogen derivatives are hereinafter referred to as "halo"); dihaloformyl compounds such as methyldihaloformyltriphenyl phosphate, dimethyldihaloformyltriphenyl phosphate, trimethyldihaloformyltriphenyl phosphate, tetramethyldihaloformyltriphenyl phosphate, pentamethyldihaloformyltriphenyl phosphate, hexamethyldihaloformyltriphenyl phosphate, heptamethyldihaloformyltriphenyl phosphate, etc.; trihaloformyl compounds such as trihaloformyltriphenyl phosphate, methyltrihaloformyltriphenyl phosphate, dimethyltrihaloformyltriphenyl phosphate, trimethyltrihaloformyltriphenyl phosphate, tetramethyltrihaloformyltriphenyl phosphate, pentamethyltrihaloformyltriphenyl phosphate, hexamethyltriahaloformyltriphenyl phosphate, etc.; tetrahaloformyl compounds such as tetrahaloformyltriphenyl phosphate, methyltetrahaloformyltriphenyl phosphate, dimethyltetrahaloformyltriphenyl phosphate, trimethyltetrahaloformyltriphenyl phosphate, tetramethyltetrahaloformyltriphenyl phosphate, pentamethyltetrahaloformyltriphenyl phosphate, etc.; and various pentahaloformyl and hexahaloformyl compounds and isomers thereof. Mixtures of two or more of these compounds are naturally included within the scope of this invention.

The TPP polycarboxylic acid halides may be produced by reacting corresponding TPP carboxylic acids with a halogenating agent. Examples of halogenating agents, particularly those industrially useful, are thionyl chloride, phosphorus trichloride, phosphorus tribromide, phosphorus pentachloride and the like, in addition to chlorine, bromine, iodine and fluorine. Of these halogenating agents, chlorine and chlorine-containing compounds are the most important industrially. The halogenation is effected ordinarily by dissolving or suspending a TPP polycarboxylic acid, the starting material, in a solvent, and then adding thereto a halogenating agent at a time or little by little. The solvent or the suspending medium is selected among liquids inert to the reaction. The medium includes, for example, dimethylformamide, phosphorus oxychloride, trichlorobenzene and the product per se. When a liquid halogenating agent is used, the excess amount thereof may possibly serve as the solvent or suspending medium. Phosphorus trichloride is a pertinent example of the above case. Ordinarily, the reaction temperature is selected from the range of 0° to 150°C., and the reaction period from the range of 15 minutes to 24 hours. Under these conditions cleavage of the phosphate linkage hardly occurs, and TPP polycarboxylic acid, the starting material, is converted into TPP polycarboxylic acid halide in satisfactory yields.

Many variations are possible in the way of effecting the present process. Particularly, the method comprising reaction of TPP polycarboxylic acid, the starting material, with phosphorus trichloride and chlorine is one of the most advantageous modes of operating the present invention. In this case, the simultaneously formed phosphorus oxychloride may be recycled to the manufacturing step for TPP polycarboxylic acid.

In separating and purifying the resultant TPP polycarboxylic acid halide from the halogenation mixture, the solvent and the unreacted halogenating agent, if present, are removed by distillation, and the residue is fractionally distilled. In case the desired TPP polycarboxylic acid halide is a solid, the aforesaid residue may be freed from the solvent and other light fractions by distillation, and then recrystallized from an inert solvent.

The TPP polycarboxylic acid halides thus obtained have two or more extremely reactive haloformyl groups and, as mentioned above, themselves are highly heat resistant and self-extinguishing. Consequently, they are of great utility values as materials with special properties in a vast field including starting materials for synthesizing fire-retarding and heat resistant products such as polymeric substances, plasticizers, cross-linking agents, textile chemicals, various antiflaming and fire-retarding agents, paint vehicles, adhesives, surface active agents, hydraulic fluids, lubricating oils, and the like, as well as modifiers and additives for those synthesized products mentioned here. Moreover, since TPP polycarboxylic acids, which are starting materials for producing TPP polycarboxylic acid halides, can be produced at a relatively low cost and are in ample supply, the merit of the TPP carboxylic acid halides as industrial chemicals will be still greater.

The following Examples illustrate the present invention in more detail, but the present invention is not limited to the Examples. In the Examples, all parts are by weight.

EXAMPLE 1

In a round-bottomed flask kept from moisture, 302 parts of phosphorus pentachloride were dissolved in 549 parts of phosphorus oxychloride, and 183 parts of finely powdered 4,4′,4″-tricarboxytriphenyl phosphate were added thereto at a temperature below 10°C. with good stirring. Then, the temperature of the reactant mixture was elevated with continued stirring to keep the mixture in fine dispersion, and maintained at 40° to 50°C. for 1 hr., then at 95°C. for 3 hr. Meanwhile, undissolved 4,4′,4″-tricarboxytriphenyl phosphate gradually disappeared and a clear homogeneous solution was obtained by the time the reaction is complete. The evolution of gaseous hydrogen chloride was ceased in 3 hr. from the beginning. After removal of phosphorus oxychloride by distillation, the reaction liquid was cooled and a small amount of precipatated unreacted phosphorus pentachloride was filtered off. The filtrate was fractionally distilled to give 185 parts of the fraction of 4,4′,4″-trichloro-formyltriphenyl phosphate boiling at 319° to 322°C./4.0 mmHg.

The product obtained was a viscous liquid, light yellow in color, and solidified on standing at room temperature. The chlorine content was found to be 20.75 percent, the theoretical value calculated for $C_{21}H_{12}Cl_3O_7P$ being 20.70 percent. According to the infrared spectroscopy, an absorption band was observed at 1,740 cm$^{-1}$ which is admittedly due to the chloroformyl group, instead of the absorption band at 1,780 cm$^{-1}$ due to the carboxyl group.

EXAMPLE 2

A fine stream of chlorine gas was introduced at 76°C. with vigorous stirring into a mixture of 32 parts of 3,3′,3″75 parts of
phosphorus trichloride and 320 parts of phosphorus oxychloride. In about 3.5 hr. the unreacted 3,3′,3″-tricarboxytriphenyl phosphate, remained undissolved and suspended, had disappeared resulting in an entirely homogeneous solution. After being heated and stirred for further 30 min., the solution was freed by distillation from phosphorus oxychloride and a small amount of phosphorus trichloride remained in the solution. The residue was distilled under vacuum to obtain 31 parts of the fraction of 3,3′,3″-trichloroformyltriphenyl phosphate boiling at 283° to 284.5°C/0.9 mmHg. The fraction was a light yellow viscous liquid which showed in its infrared spectrum no absorption band due to a carboxyl group; the chlorine content of the fraction was found to be 20.79 percent, the theoretical value calculated for $C_{21}H_{12}Cl_3O_7P$ being 20.70 percent.

EXAMPLE 3

40 Parts of 4,4′-dicarboxytriphenyl phosphate was added to 200 parts of thionyl chloride, and heated for 5 hr. at 78° to 80°C., at which temperature the thionyl chloride refluxed. After removal of the unreacted thionyl chloride by distillation from the reaction mixture, the residue was distilled under vacuum to obtain 41 parts of the fraction of 4,4′-dichloroformyltriphenyl phosphate boiling at 257° to 259°C./0.2 mmHg. According to the measurement of the infrared spectrum, no characteristic absorption due to a carboxyl group was recognized, whereas there were clearly observed two absorption bands at 1,780 cm$^{-1}$ and 1,740 cm$^{-1}$ which were admittedly due to a chloroformyl group. The chlorine content of the fraction was found to be 15.80 percent, the theoretical value calculated for $C_{20}H_{13}Cl_2O_6P$ being 15.73 percent. The fraction was a white solid having a melting point of about 60°C.

EXAMPLE 4

A mixture of 30 parts of 3,3′-dicarboxytriphenyl phosphate, 33 parts of phosphorus pentachloride and 150 parts of phosphorus oxychloride was heated with stirring at 106°C. under reflux of phosphorus oxychloride for 2 hr. to effect chlorination. The reaction mixture was treated in the same manner as in Example 1, to yield 31 parts of 3,3′-dichloroformyltriphenyl phosphate boiling at 252° to 256°C./0.12 mmHg. The fraction was a clear viscous liquid, light yellow in color, which solidified upon standing at room temperature into a white solid melting at about 50°C. The absorption band due to a chloroformyl group was found at about 1,760 cm$^{-1}$ in the infrared spectrum of the fraction. The chlorine content of said fraction was found to be 15.83 percent, the theoretical value calculated for $C_{20}H_{13}Cl_2O_6P$ being 15.73 percent.

What is claimed is:

1. A polyhaloformyl triphenyl phosphate of the formula

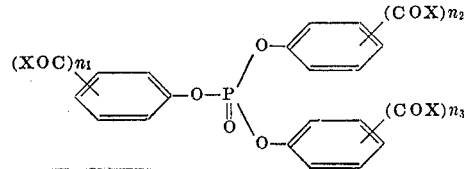

wherein X is a halogen atom, $n_1$, $n_2$ and $n_3$ each are integers of 0 to 2, provided that the sum, $n_1 + n_2 + n_3$, is 2 or more, and the substitution site of a haloformyl group is selected from positions 3, 4 and 5 of each phenyl group.
2. 4,4′,4″-Trichloroformyltriphenyl phosphate.
3. 3,3′,3″-Trichloroformyltriphenyl phosphate.
4. 4,4′-Dichloroformyltriphenyl phosphate.
5. 3,3′-Dichloroformyltriphenyl phosphate.

* * * * *